May 18, 1937. H. C. PETERSEN 2,080,503
OPHTHALMIC MOUNTING
Filed July 15, 1936
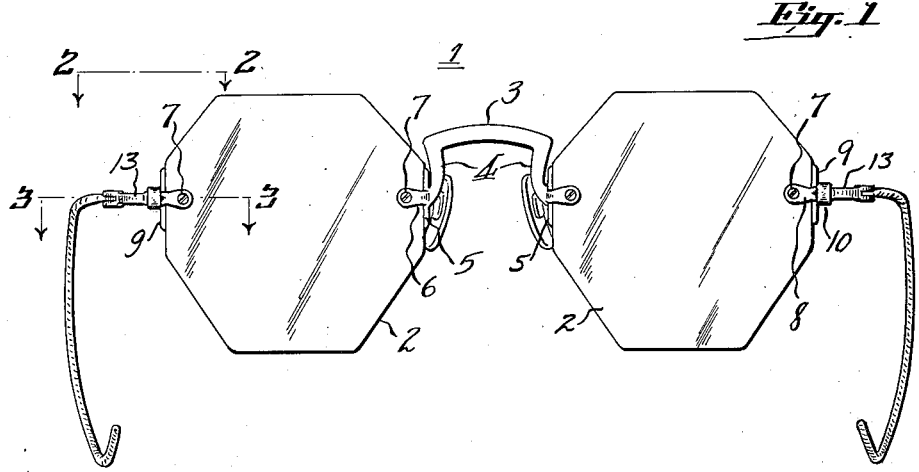
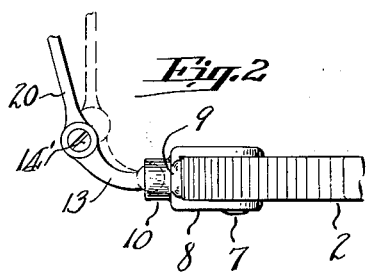
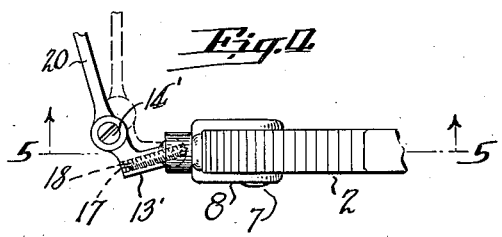
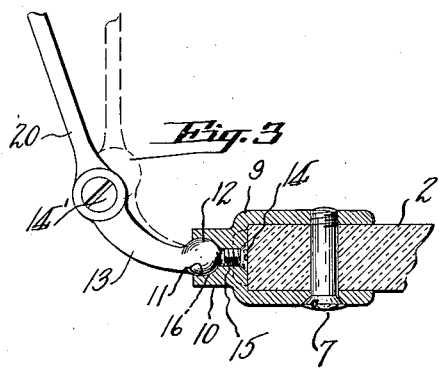
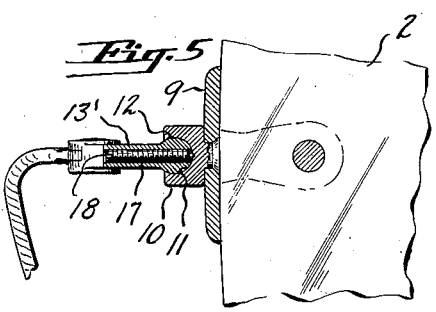
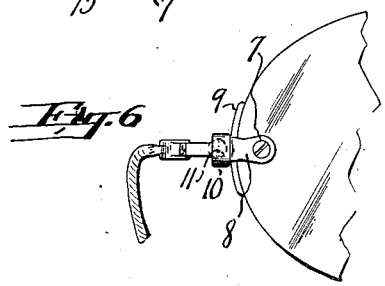
INVENTOR.
Henry C. Petersen,
BY
ATTORNEY.

Patented May 18, 1937

2,080,503

UNITED STATES PATENT OFFICE 2,080,503

OPHTHALMIC MOUNTING

Henry C. Petersen, Hillside, N. J., assignor to Lowres Optical Manufacturing Co., Newark, N. J., a corporation of New Jersey Application July 15, 1936, Serial No. 90,673

6 Claims. (Cl. 88—53)

This invention relates, generally, to ophthalmic mountings, and the invention has reference, more particularly, to means for adjustably connecting the lenses of spectacles and eyeglasses to the temples thereof.

Heretofore, temple end pieces used in connection with spectacles and eyeglasses merely provided a hinged connection between the lenses or lens rims and the temples, no means being provided for adjusting the temples with respect to the lenses or lens rims to facilitate the fitting of the eyeglasses, and such fitting could only be accomplished by bending the temples which is undesirable and generally results in improper fitting of the eyeglasses.

The principal object of the present invention is to provide a novel construction of temple end piece that enables the universal adjustment of the temple with respect to the lens or lens rim, thereby enabling the optician to readily and accurately fit the eyeglasses to the head of the wearer, means being provided for locking the temple end piece yoke in adjusted position with respect to the temple end piece lens strap, whereby the proper positional relation between the temple hinge and the lens will always be maintained thereafter.

Another object of the present invention is to provide a temple end piece construction that is suitable for attachment to any point along the periphery of the lens, the universal adjustment of the end piece enabling such attachment.

Still another object of the present invention is to provide a novel ophthalmic temple end piece construction that is neat and attractive in appearance, that is of rugged construction and reliable in use.

Other objects of this invention, not at this time more particularly enumerated, will be clearly understood from the following detailed description of the same.

The invention is clearly illustrated in the accompanying drawing, in which:

Fig. 1 is a view in front elevation of a pair of spectacles equipped with the novel temple end piece construction of this invention.

Fig. 2 is a fragmentary view in plan showing the adjustable nature of the end piece construction.

Fig. 3 is an enlarged transverse part sectional view of the structure shown in Fig. 2.

Fig. 4 is a view similar to Fig. 2, but of a somewhat modified construction.

Fig. 5 is a view in elevation with parts broken away of the structure shown in Fig. 4.

Fig. 6 is a fragmentary view in front elevation of the structure shown in Figs. 4 and 5.

Similar characters of reference are employed in said views, to indicate corresponding parts.

Referring now to Figs. 1 to 3 of the said drawing, the reference numeral 1 designates a pair of spectacles shown as of the rimless type and having lenses 2 that are interconnected by the mounting or bridge member 3 in the usual manner. Bridge member 3 has depending arms or yokes 4, to the lower ends of which are integrally or otherwise connected lens straps 5 having perforate arms 6 for receiving fastening screws 7 that pass through apertures provided in the inner edge portions of the lenses substantially mid-way of the height thereof. The outer edge portions of lenses 2 are also perforated substantially midway of the height of each lens in the usual way for receiving additional fasteners 7 that also pass through the perforate arms 8 of the temple end piece straps 9.

Each of the temple end piece straps 9 is provided with an outwardly extending boss 10, shown as of cylindrical shape, which boss is provided with a spherical seat or receiving recess or socket 11 for receiving the ball portion 12 of the temple end piece yoke 13. The outer portion of the boss 10 surrounding the seat or receiving recess 11, is adapted to be spun or squeezed over somewhat so as to overlie the ball end portion 12, i. e. beyond the mid plane of the ball, thereby retaining the ball end portion 12 within the recess 11 of boss 10. The yoke 13 is provided with the usual temple screw 14' to which the temple is hingedly connected. The ball end portion 12 of the yoke 13 cooperates with seat 11 to provide a universal connection between the strap 9 and the yoke 13, thereby enabling the temple 20 to be set at any desired angle with respect to the strap 9, to greatly facilitate the fitting of the glasses to the wearer's face and head.

In order to secure the ball end portion 12 in a selected adjusted position within the recess 11, a screw 14 is provided which is threaded through an aperture 15 provided in the temple end piece strap 9, the said aperture 15 extending outwardly from the bight portion of the strap 9 and lying substantially in the central vertical plane of the lens 2. The free end 16 of screw 14 is pointed so that the optician may engage this pointed end against the ball end portion 12, after the temple has been adjusted as desired, thereby locking the ball end portion against turning.

The screw 14 would ordinarily be of steel or other hard material whereas the ball end portion 12 is ordinarily of precious metal alloy, and hence softer than the screw 14 so that the pointed end of the screw will readily pierce the surface of the ball end portion 12 and form a slight depression therein, thereby serving to positively hold the ball end portion and hence the yoke 13 from turning within socket 11 or with respect to the lens strap 9.

It will be apparent that the temple end piece consisting of strap 9 and yoke 13 may be mounted at any point on the lens end portion either above or below the mid height of lens owing to the fact that the ball end portion 12 cooperates with seat 11 to provide for the universal positioning of the temple 20 with respect to the strap 9. It will be noted that with screw 14 in place, the head of the same is engaged by the lens 2, thereby preventing the accidental loosening of the screw.

If desired, the locking screw may be carried by the temple end piece yoke member instead of by the lens strap. Such a construction is illustrated in Figs. 4 to 6. Parts of these figures which are similar to the parts of the previous figures are similarly numbered. In Figs. 4 to 6 the yoke 13' has a somewhat modified shape in plan from the form shown in the previous figures and is provided with a threaded aperture 17 for receiving the locking screw 18. The screw 18 extends through the ball end portion 12 and is adapted to engage the surface of receiving recess 11. The screw 18, being of harder material than that of the boss 10, readily forms a slight depression in this boss within the recess 11, as shown in Figs. 4 and 5, thereby serving to lock the ball end portion 12 in any desired position within the recess 11.

The form of the invention shown in Figs. 4 to 6 may be used wherever the form shown in the previous figures is employed and is somewhat easier to fit inasmuch as the screw 18 is readily accessible with the regular lens 2 in place. Although the invention has been shown applied to spectacles of the rimless type, the same is equally applicable to spectacles having rims.

As many changes could be made in the above construction and many apparently widely different embodiments of this invention could be made without departing from the scope thereof, as defined by the following claims, it is intended that all matter contained in the above description or shown in the accompanying drawing shall be interpreted as illustrative and not in a limiting sense.

I claim:

1. A temple end piece for spectacles and eyeglasses comprising, a lens strap for attaching to a lens, said strap having a spherical receiving recess therein, a yoke member provided with a ball end portion universally seated in said recess, locking means for securing said ball end portion in adjusted position within said recess, and a temple hingedly connected to said yoke member.

2. A temple end piece for spectacles and eyeglasses comprising, a lens strap provided with a receiving member, said member having a receiving socket of spherical contour, a yoke member having a ball end portion universally mounted in said socket, and a screw threaded through one of said members for engaging the other of said members to lock said members in adjusted position.

3. A temple end piece for spectacles and eyeglasses comprising, a lens strap provided with a receiving member, said member having a receiving socket of spherical contour, a yoke member having a ball end portion universally mounted in said socket, and a screw threaded through one of said members for engaging the other of said members to lock said members in adjusted position, said screw having a pointed end and being of harder material than the other of said members, whereby the surface of the latter is penetrated by said screw.

4. A temple end piece for spectacles and eyeglasses comprising, a lens strap provided with a projecting boss having a spherical socket therein, a yoke member having a spherical end portion universally mounted in said socket, and a screw threaded through said lens strap for engaging said yoke member to lock the same from turning with respect to said lens strap.

5. A temple end piece for spectacles and eyeglasses comprising, a lens strap provided with a projecting boss having a spherical socket therein, a yoke member having a spherical end portion universally mounted in said socket, and a screw threaded through the bight portion of said lens strap and having a pointed end for piercing the surface of said yoke member end portion to thereby lock the yoke member against movement with respect to said lens strap, the lens of the spectacles serving to prevent the loosening of said screw.

6. A temple end piece for spectacles and eyeglasses comprising, a lens strap provided with a projecting boss having a spherical socket therein, a yoke member having a spherical end portion universally mounted in said socket, and a screw threaded through said yoke member for engaging said lens strap to lock the same against relative movement with respect to said yoke member.

HENRY C. PETERSEN.